Sept. 29, 1953 C. NOLAN 2,653,330
SEAT-ATTACHED BASSINET
Filed Sept. 27, 1951 2 Sheets-Sheet 1

Inventor
Charles Nolan,
by George H. Baldwin
His Attorney.

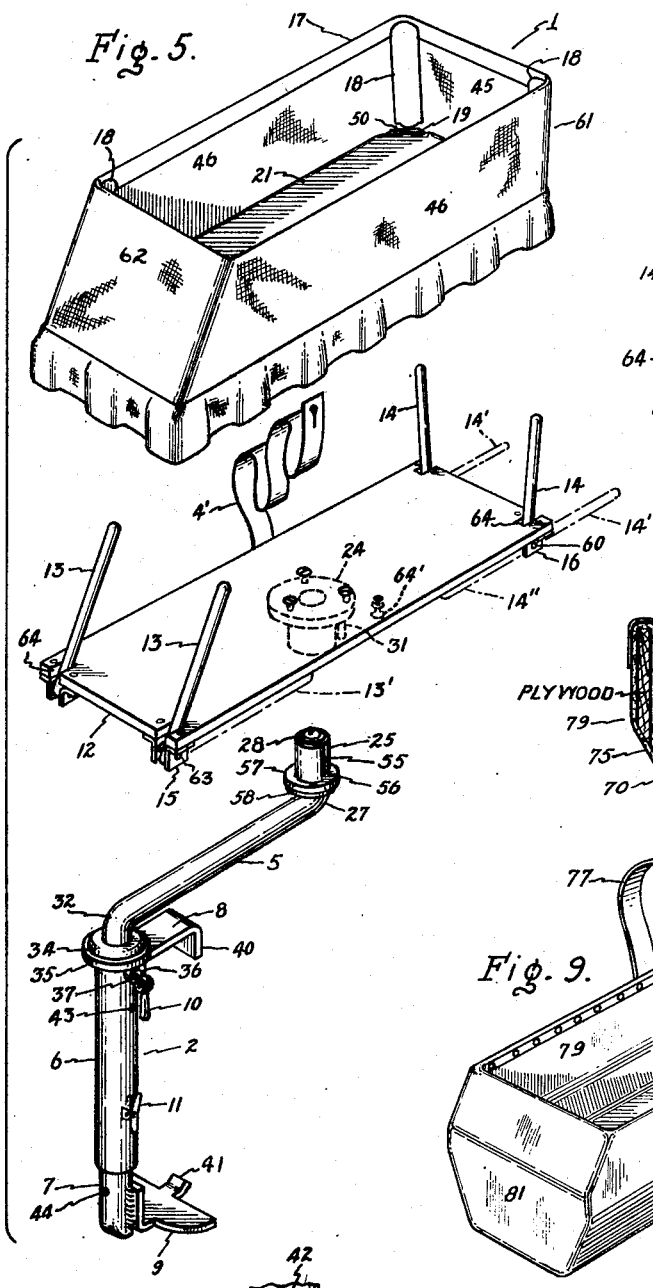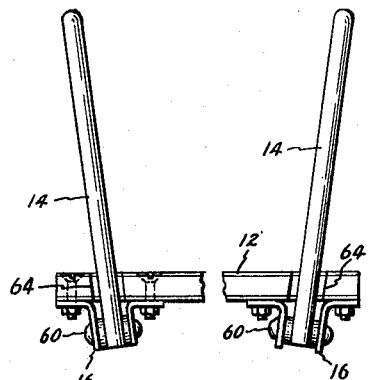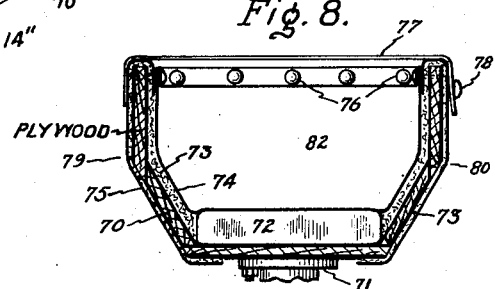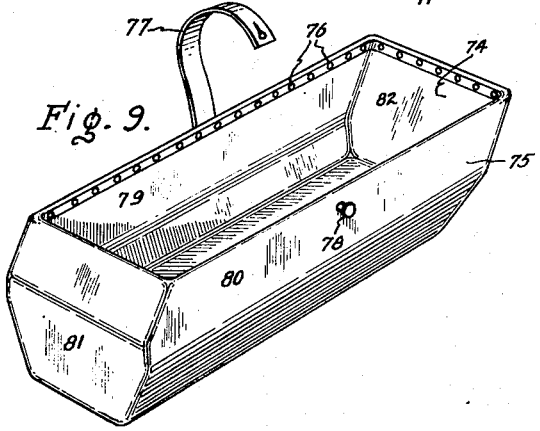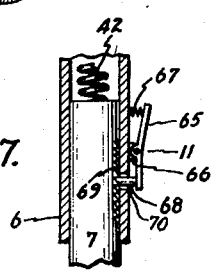

Patented Sept. 29, 1953

2,653,330

UNITED STATES PATENT OFFICE 2,653,330

SEAT-ATTACHED BASSINET

Charles Nolan, Jacksonville, Fla.

Application September 27, 1951, Serial No. 248,540

7 Claims. (Cl. 5—94)

My invention relates to baby-holding baskets or bassinets for highway busses, transport aircraft, railroad passenger cars, and the like, and more particularly to bassinets for attachment to the seats of such busses, aircraft and cars.

An object of my invention is to provide a holder for an infant being carried in a long-distance motor coach, highway bus, transport aircraft, railroad passenger car or the like, which will be safe, convenient and comfortable for the infant, for the mother or other person caring for the infant, for the transport line personnel, and for other passengers.

A further object of my invention is to provide an infant carrier which is readily attachable and detachable in convenient position within a bus, aircraft, railroad car, or the like, and which may be readily cleaned and stored between periods of use.

Accommodations for infants or babies in busses and aircraft, and often on railroad trains, have heretofore generally comprised merely a pillow which may be uncomfortably held in the mother's lap, or dangerously placed in an empty seat, this extra seat being thus wasted insofar as revenue to the transportation company is concerned. Many suggestions have heretofore been made for carriers for infants in motor vehicles, but such suggestions have not offered a satisfactory provision from the standpoints of safety, comfort, convenience, space saving, ready cleanability or ready storability, which are important generally in public transportation and specifically in bus, air and rail transportation.

It is, accordingly, an important object of my invention to increase the safety, comfort and convenience with which infants may be transported in public conveyances, and to provide means for this purpose which will conserve space, will be readily cleaned and stored, and will be adjustably and detachably arranged within the conveyance without requiring any modifications or additions to the structure thereof.

Figure 1:
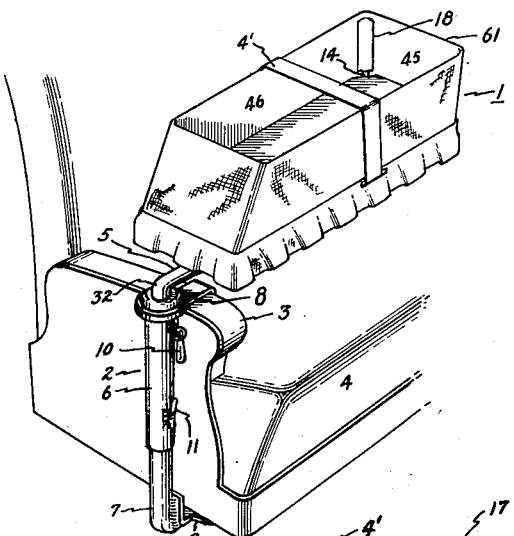
Figure 2:
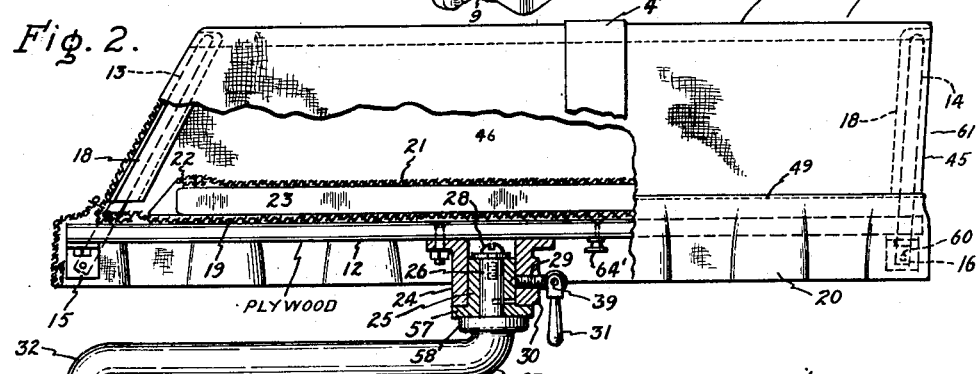
Figure 3:
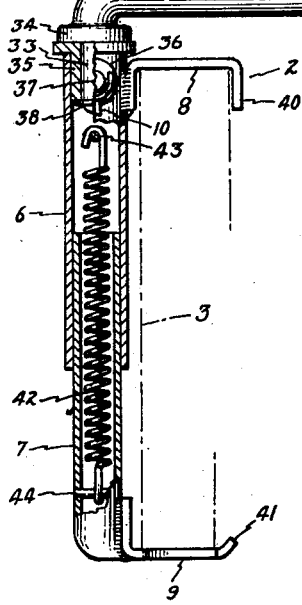
Figure 3:
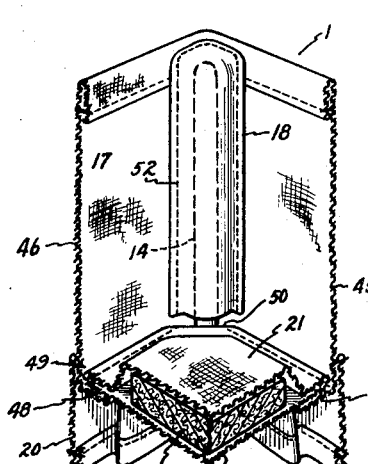
Figure 4:
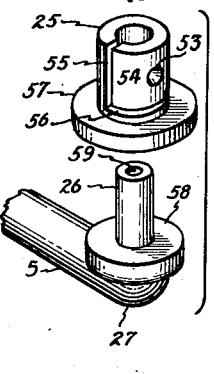

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings, in which Fig. 1 is a perspective view of a bassinet or infant carrier attached to the arm structure of a seat of a bus or aircraft, in accord with my invention; Fig. 2 is a partially cut away side view of the bassinet of Fig. 1; Fig. 3 is a detail sectional view of one corner of the fabric member which forms the baby-holding basket portion of the device of Fig. 1; Fig. 4 is a detail view of an attachment bearing embodied in the device of Figs. 1 and 2; Fig. 5 is an exploded view of the bassinet, including the supporting attachment means thereof, of Figs. 1 through 4; Fig. 6 is a detail view of corner portions of the baby-holding basket of the bassinet of Figs. 1 through 5; Fig. 7 is a detail sectional view of a portion of the attachment means of the bassinet of Figs. 1 through 6; and Figs. 8 and 9 are sectional end and perspective views, respectively, of a modified baby-holding basket useful with the supporting and attachment means of Figs. 1 and 2.

In the view of Fig. 1, a baby-holding basket 1 is shown supported by a clamping mechanism 2 from the arm structure 3 of a bus or aircraft seat. As shown, the basket 1 is disposed above and parallel to the seat cushion 4 in a position such that a person caring for the baby could be comfortably seated in the seat, while the baby would be supported in the basket 1 just above the lap of such person. A safety belt 4' may be arranged over the infant as shown. The basket 1 is supported approximately centrally from below by a horizontal bar 5 attached thereto by a pivot, later described, which permits rotation of the basket about a vertical axis at its approximate center. Bar 5, in turn, is pivotally supported adjacent the outside of the seat arm 3 by the clamping mechanism 2 to permit the bar, and the basket 1 carried thereby, to swing about a vertical axis coincident with the axis of tubular members 6 and 7 of the clamping mechanism. Of these tubular members, member 6 is an upper member having an internal diameter slightly greater than the outside diameter of the lower member 7 which telescopes thereinto. An upper shoe 8 is welded or similarly attached to the upper member 6 and fits snugly over the top of the arm rest of the bus seat, while a lower shoe 9 is attached to the lower member 7 and is pulled up firmly against the bottom of the rigid arm structure 3. The arm rest upper portion of the rigid arm structure 3 is preferably resilient or yielding, but my invention is also applicable to arm structures having wooden or metal rigid arm rests.

A small handle 10 is arranged on member 6 to control a clamping action on bar 5 which will permit the bar to be held against swinging about the vertical axis, and a second similar arrangement is provided to lock the basket to bar 5 against rotation about its center, as described in connection with Fig. 2. The operation of the clamping mechanism 2 is such as to cause shoes 8 and 9 to be biased toward each other, and a simple safety locking device 11 may be and is preferably provided as further considered hereinafter.

The details of the bassinet construction will be more apparent in Fig. 2, wherein the basket 1 is shown to comprise a flat board, base or lower frame member 12, preferably of plywood, which forms the bottom of the basket, upstanding posts 13, 14 hingedly mounted to the base 12 by hinges 15 and 16, respectively, and a fabric member 17, which is retained by posts 13, 14 in extended, box-like shape. More specifically, a post 13 or 14 extends upwardly from each of the four corners of the rectangular base 12, and a fabric pocket portion 18 at each corner of the fabric member 17 slips down over each respective post, whereby the fabric member is readily removable by raising each corner off of its post.

The fabric member 17 further comprises end walls and side walls for the basket, as seen more clearly in Fig. 5 later described, a bottom wall portion 19, a skirt 20, and a mattress pocket portion 21, all shown in Fig. 2. The mattress pocket portion 21, skirt 20 and bottom wall portion 19 are all joined together and to the side and end walls peripherally around the base, except that one or both ends 22 of the pocket portion 21 are not so joined, thereby to permit the mattress or soft pad 23 to be inserted in the pocket formed between portion 21 and bottom wall portion 19, and to be removed therefrom to permit appropriately different cleansing of the mattress and fabric member 17, respectively. The mattress may be covered with a plastic waterproof material, for example, and may be cleaned by wiping with a damp cloth, while the fabric member 17 may be washed in soap and water or "dry cleaned" in a detergent medium.

The whole basket 1 is supported through a bracket 24 bolted to the underside of lower frame member 12 adjacent the center thereof. This bracket comprises a cylindrical socket which receives a cylindrical bushing 25, and the bushing is cylindrically bored to receive a cylindrical post 26. The post is firmly attached to and forms a part of the horizontal supporting bar 5, at the upturned end 27 of the bar. A screw and washer 28 are preferably arranged at the upper end of post 26 in a manner to retain bushing 25 on the post. The bushing 25 is free to rotate on post 26, thereby to permit the basket 1 to rotate in a horizontal plane about its approximate center, such rotation being about the common vertical cylindrical axis of the socket of bracket 24, the bushing 25 and the post 26. Since such rotation is desirable only from time to time, however, provision is made for locking the bracket 24 to post 26. It will be noted that bushing 25 is split, and a clamp screw 29 is threaded through a thickened portion 30 of the bracket to engage within an indentation in the bushing, the inner end of screw 29 being reduced into a semispherical or conical shape, or the like, for this purpose. The bushing is so slit that tightening screw 29, by means of its attached handle 31, causes bushing 25 to bind upon post 26. Thus the bushing 25 cannot rotate on the post, and the engaged end of screw 29 prevents rotation of bracket 24 on the bushing, thus locking the base 12 to the bar 5. In order that this locking action may be effective, it is preferable that the cylindrical surface of post 26 and the surface of the bore of bushing 25 be machined to a not quite smooth or slightly pitted surface, or that vertical knurls or shallow grooves be provided in one or both surfaces, but such surface markings or roughness should not be so pronounced as to interfere with rotation of the bushing on the post when screw 29 is loosened.

In respect to this mounting arrangement of the basket on bar 5, it will be further apparent that the lower end of bushing 25 is flanged outwardly to provide a thrust bearing surface for the lower end of bracket 24, and that the lower face of the flange bears against the upper face of a flanged portion of end 27 of bar 5 to permit rotation of bushing 25 on post 26.

The end 32 of bar 5, opposite end 27, is downturned and terminates in a post 33 and flange 34 in all respects similar to the arrangement at end 27 such that bar 5 could be turned end for end and used without change. Surrounding post 33 to support bar 5, is a bushing 35 similar to bushing 25 heretofore described. Bushing 35 fits within the upper end of cylindrical tube 6, and tube 6 carries an enlarged portion 36 bored and threaded to receive locking screw 37, which operates with bushing 35 in the manner heretofore described for screw 29 and bushing 25, to lock tube 6 and bar 5 together when the screw is tight, and to permit arm 5 to swing in a horizontal plane about the common vertical axis of post 33, bushing 35 and tube 6 when the screw 37 is loosened. Washer and screw 38 carried by the end of post 33 prevent the separation of bushing 35 from the post.

Screws 29 and 37 are operated by the pivotally attached handles 31 and 10, respectively. The handle in each case is free to swing on a pin transverse to the length of the screw, such as pin 39 of handle 31. Thus in tightening or loosening screw 29, for example, the handle may be pulled up toward the board 12 until the handle touches the board while rotating the screw in a predetermined direction. If it is desired to continue this rotation, the handle may be swung through 180 degrees about its pin 39, at which time further rotation of the screw is accomplished by moving the handle away from the board. The thread pitch of the screws 29 and 37, and the proportions and surface conditions of bushings 25 and 35 and posts 26 and 33, should be such that only about one-quarter turn of each screw is necessary to lock or unlock the respective bushing and post selectively to lock and unlock the members for horizontal swinging as described. When it is desired to remove the basket from bar 5, however, the screw 29 will be loosened sufficiently to disengage from the indentation in bushing 25, thereby to permit the bracket 24 to be lifted from the bushing. Similarly, screw 37 may be sufficiently loosened, as by several turns of the handle 10, to permit removal of bar 5 and bushing 35 from tube 6.

Fig. 2 clearly shows the upper shoe 8 welded to tube 6 and demonstrates the downturned inner end 40 which hooks over the arm rest upper portion of the arm structure 3 indicated by broken lines. Lower shoe 9 is welded at the lower end of the lower tube 27 to hook under the solid or rigid lower portion of arm structure 3, and since this portion is rigid, only a small tab portion 41 at the inner edge need be upturned to hook under the structure firmly to hold tube 7 thereto. Since the lower portion, or bottom, of the arm structure 3 may be close to the floor of the bus, the tab should not be long and may turn upwardly at about 45 degrees rather than vertically upward. When so arranged, the shoe 9 is most easily positioned, yet the attachment is entirely adequate and safe.

As further shown in Fig. 2, a tension spring 42 is disposed within the telescoping tubes 6 and 7, being attached at its upper end by a pin 43 to tube 6 and at its lower end by a pin 44 to tube 7. This spring urges or tensions tubes 6 and 7 toward the telescoped position and, accordingly, urges shoes 8 and 9 toward each other. When shoe 9 has been placed under the arm structure 3 and shoe 8 has been raised against the spring and slipped over the arm rest top portion of the arm structure, the tubes 6 and 7 are firmly clamped to the arm structure and will not become dislodged therefrom as the result of any likely occurring force. The safety of the attachment is further insured, however, by the operation of a detent or ratchet mechanism indicated at 11 in Fig. 1 and shown in detail in Fig. 7 later described.

Fig. 3 shows a corner of the fabric member 17 in place on a post 14 and with a mattress 23 in position between bottom wall portion 19 and pocket portion 21. An end wall 45 and side wall 46 are suitably hemmed at the top, and extend inwardly at the bottom to be stitched, as at 47 and 48, respectively, peripherally around the mattress 23 to the portions 19 and 21, except that at least one end of member 21 is not so stitched as previously explained and as seen in Fig. 2. The skirt 20 is suitably hemmed at the bottom and is stitched, as at 49, to the end and side walls. A small opening 50 is left between the portions 19 and 21, on the one hand, and the corner formed by end and side walls 45 and 46, on the other, to permit the post 14 to pass upwardly into an elongated pocket formed between a fabric pocket member 18 and the side and end walls, to which member 18 is attached by stitches 52. This pocket is closed at the top and along each side but is open at the bottom to receive the post. One such pocket is provided, together with an opening like opening 50, at each corner of the fabric member 17.

Fig. 4 discloses bushing 25 removed from post 26. The side indentation 53 in bushing 25 is adapted to receive the end of the locking screw as previously described, and such screw may be tightened to bend the portion 54 of the bushing inwardly to reduce the size of the bore therein. A vertical slot 55 and horizontal slot 56 serve to define the portion 54 and to permit this portion to bend under the force of the screw in indentation 53. The bushing should be of a metal sufficiently resilient to return the portion 54 to its original position whenever the screw is loosened to unlock the bushing from the post 26. Slot 56 is cut only through about one-third or one-half of the bushing circumference. As heretofore described, the flange 57 of the bushing acts as a support and thrust bearing, on top of the flange for the bracket attached to the basket frame member, and on the bottom of the flange against the flange 58 formed on end 27 of bar 5.

As heretofore mentioned, the surface of the bore of bushing 25 and the outer cylindrical surface of post 26 are preferably sufficiently rough to provide an effective clamping or locking of bushing 25 on post 26 when the portion 54 is pressed inwardly, yet smooth enough not to interfere with rotation of the bushing on post 26 when the portion 54 is not deflected inwardly. The tapped opening 59 at the top of post 26 is arranged to receive a screw which, as seen at 28 in Fig. 2, will hold bushing 25 down on post 26. The arrangement for end 27 of bar 5 shown in Fig. 4 is equally applicable to the other end 32 of the arm, with the parts merely inverted.

The bassinet is shown in exploded view in Fig. 5 comprising, as major parts, the fabric member 17, the base 12 carrying posts 13 and 14 and bracket 24, and the clamping support 2 comprising bar 5 and telescoping tubes 6 and 7. Fabric member 17 is arranged to fit down over the posts 13 and 14 to form the supported basket portion. However, posts 14 when upright extend slightly away from each other, with their upper ends further apart than their lower ends. In order to bring the posts 14 into parallelism, they are rotated on hinged supports 16 into the extended horizontal positions indicated in broken lines at 14'. The hinge pins 60, of hinges 16, on which posts 14 swing, are inclined downwardly and outwardly, as best seen in the detail view of Fig. 6, but are perpendicular to the length of the board or base 12, whereby the posts 14 slant outwardly from each other when raised, as in Fig. 6, slant inwardly toward each other when swung into a downward direction, and are parallel when in a horizontal position, either extending outwardly from the end of the base 12, as shown at 14' in Fig. 5, or inwardly from the end under the base 12, in the position shown at 14'' in Fig. 5.

With the posts extended in position 14', pockets 18 of the head end 61 of the fabric member 17 may be fitted over the posts. Thereafter the posts are swung into the upright approximately vertical position, whereby the end 61 is held vertical and opened out slightly toward the top. The pockets of the foot end 62 of the fabric member 17 are now fitted over the raised parallel posts 13. The hinge pins 63 of hinges 15 which mount posts 13 are horizontal and perpendicular to the length of base 12, and the posts 13 may be swung parallel to each other from the solid line positions shown in Fig. 5 to the broken line positions at 13'. Swinging posts 13 and 14 into the positions flat against the underside of base 12 permits conveniently compact storage of the bassinet. In swinging the posts into operative positions above the base, it is to be noted that each post extends into a notch 64 in the base 12, and that the swing is limited by contact of each respective post with the bottom or end of the notch. The notches are so cut that the posts 14 cannot pass beyond an approximately vertical position, while the posts 13 can swing inwardly beyond the vertical to dispose the foot end of the basket portion in an inwardly sloping position, partially over the feet of an infant in the basket. The posts 14 may be limited to swing not quite up to the vertical if it is desired that end 61 of the basket slope outwardly at the infant's head. Safety belt 4' is shown attached to the underside of base 12 and arranged to extend completely over the fabric member 17 and to fasten under the other side of the base, as to a button knob 64' to engage a button hole in the belt.

Bracket 24 on the underside of base 12 fits over bushing 25 on end 27 of bar 5, as heretofore explained in connection with Fig. 2, and handle 31 may be loose to permit the bushing with the basket portion to rotate on this end of the bar, or tightened to lock the bar and basket portion together. Bar 5 is swingably mounted on tube 6, and this tube carries an inwardly extending upper shoe 8 to fit over the top or arm rest portion of a seat arm structure. The preferred design of shoe 8, and of the lower shoe 9 carried by telescoping tube 7 are clearly seen in Fig. 5. It will be noted that handle 10 is arranged at a side of tube 6, rather than opposite shoe 8, whereby the handle will not protrude into the aisle of the bus. In practice, the handle 10 and its screw 37 are preferably so adjusted that the handle 10, when the screw is tight to lock bar 5, will lie over against the seat arm adjacent shoe 8. It is then completely out of the way of persons in the aisle. Safety ratchet or detent mechanism 11 is also located along the side of tube 6 in a position unlikely to catch the clothes of persons in the aisle.

Fig. 7 discloses the details of the safety ratchet or detent mechanism, being a partially sectional side view of portions of tubes 6 and 7. The position of spring 42 is indicated for reference.

A hand-actuated detent member 65 is rockably attached to tube 6 by means of two small ears 66, one of which is visible, and a suitable journal pin, and is urged into the position shown by a compression spring 67 between the tube and an end of member 65 which may be pressed by the thumb. When so pressed, member 65 rocks about the pin holding it to ears 66 and raises pawl 68 away from engagement with notches 69 which are formed on the surface of tube 7. With the pawl so disengaged, tubes 6 and 7 may be drawn apart against the tension of spring 42. Upon release of member 65, pawl 68 is forced back through opening 70 in tube 6 into engagement with notches 69. The notches and engaging end of pawl 68 are wedge shaped in the direction to permit each notch to lift the pawl over into the next notch as the tubes 6 and 7 are further telescoped, but to prevent the extension of tubes 6 and 7 without manual actuation of detent member 65 to disengage the pawl from the notches.

In operation in the installation of the bassinet, shoe 9 will be hooked under the arm structure, detent member 65 will be operated to disengage the pawl, and the tubes 6 and 7 will be extended manually against the spring tension until shoe 8 is slipped over the arm rest or top of the arm structure. The detent may then be released, and the pawl will click over the notches 69 as spring 42 telescopes the tubes 6 and 7. The attachment is thus automatically completed by the cooperation of spring 42 and the detent mechanism, whereby the clamping support 2 may not be removed from, and is safely held to, the seat arm, until the detent is manually and intentionally operated.

Furthermore, with the clamping support in place as described, if the arm structure carries a resilient arm rest upper portion, greater tightening of the clamp is readily and simply obtained by merely pressing down on shoe 8, or on end 32 of bar 5. This action presses shoe 8 into the arm rest and spring 42 automatically maintains shoe 9 against the bottom of the arm structure and pulls the tubes into further telescoped position, in which position they are firmly held by the automatic detent mechanism. A measure of self-adjustment is also furnished by the combination in that a heavy infant placed in the basket will cause the arm rest to be somewhat depressed by the shoe 8, and the spring 42 and detent mechanism take up as before. After the clamping mechanism is in place, with either a rigid or resilient arm rest, mechanical failure of either the spring 42 or detent mechanism will not cause the clamping mechanism to become detached, although a broken spring would make attachment of the clamping mechanism more difficult, and failure of either would make the attachment somewhat less safe.

While the basket construction described is desirable from the aspects of ready cleansing and compact storage, a more attractive appearance may be obtainable by forming a permanent non-disassemblable as shown in Figs. 8 and 9. Such basket may comprise a wooden box-like frame 70 carrying underneath a mounting bracket 71 similar to bracket 24 heretofore described. A mattress 72 is disposed in the bottom of frame 70, and the inner and outer sides of the frame are preferably padded with padding 73. The inside may then be lined with a smooth, easily cleaned plastic sheet material 74, and the outside covered with an attractive, wear resistant material 75, such as simulated leather. The lining and outer covering are held in place by a row of attractive, smooth headed tacks 76 adjacent the upper edge of the basket.

A safety belt 77 may be provided affixed permanently to one side of the basket frame and attachable across the top, over the infant in the basket, to button attachment means 78 on the other side of the frame.

The basket of Figs. 8 and 9 may comprise sides 79 and 80 generally slanting upwardly and outwardly, at least in part, a foot end 81 turned inwardly over the feet of an infant in the basket, and a head end 82 slanting outwardly to provide additional room at the head. This basket construction is, of course, adapted for use with the supporting means 2 of Fig. 5.

While I have shown only certain preferred embodiments of my invention by way of illustration, many modifications will occur to those skilled in the art, and I therefore wish to have it understood that I intend, in the appended claims, to cover all such modifications as fall within the true spirit and scope of my invention.

What I claim as new and desire to secure by Letters Patent of the United States is:

1. A bassinet, for attachment to a rigid seat arm structure having a resilient upper portion, said basinet comprising a baby-holding basket, a supporting member attached to said basket, and a clamping support for said member comprising an upper shoe to engage said resilient upper portion, a lower shoe to engage under said rigid structure, a spring urging said shoes toward each other, and automatic ratchet means to retain said shoes in maximum clamped relation to said structure.

2. A bassinet, for attachment to a rigid seat arm structure having a resilient upper portion, said bassinet comprising a generally rectangular baby-carrying basket, said basket having a horizontally disposed bottom flange portion, a supporting bar disposed horizontally below said bottom portion, one end of said bar being upturned, vertical pivot connection means between said upturned end of said bar and said bottom portion adjacent the center of said portion, whereby said basket may be rotated in a horizontal plane about its approximate center, an upper vertical tubular member carrying adjacent its top an arm-rest-engaging shoe, the other end of said bar being downturned, vertical pivot connection means between said top of said tubular member and said downturned end of said bar, whereby said bar may be swung in a horizontal plane about the vertical pivot axis of said last connection means, respective locking means for each of said connection means effective selectively to lock said basket against said rotation and to lock said bar against said swinging respectively, a lower vertical tubular member arranged to telescope in said upper member and carrying adjacent its lower end an arm-structure-engaging shoe, and releasable ratchet means automatically to retain said lower tubular member against withdrawal from substantially the maximum inserted position thereof in said upper tubular member.

3. A bassinet, for removable attachment to a seat arm structure, said bassinet comprising a generally rectangular base member, a post pivotally mounted to each corner of said base to swing into a folded position flat against said base and selectively into upwardly extending position, a flexible sheet material member positionable over said posts to form an infant-carrying basket, a support for said basket comprising a horizontal bar, a vertical pivot connection between one end of said bar and said base member, a spring loaded clamp device to clamp to said arm structure, and a pivotal attachment mounting said bar to said device in position for said bar to swing horizontally over said arm structure.

4. A bassinet, for attachment to a seat arm structure, said bassinet comprising a base, means comprising a collapsible frame extending upwardly from said base and a fabric member removably attached to said frame to form a foldable, infant-carrying basket, a horizontal bar, a pivot device attached to the underside of said base and to said bar to mount said basket for horizontal rotation on said bar, said device comprising locking means selectively operable to lock said basket against said rotation, and a pivotal support remote from said device for supporting said bar for horizontal swinging, said support comprising spring urged shoes to engage said structure and to clamp said support to said structure and further comprising locking means selectively operable to lock said bar against said swinging.

5. A baby bassinet for attachment to a seat arm structure, said bassinet comprising a baby-holding basket, a clamp comprising an upper shoe and a lower shoe, said shoes being adapted and arranged to engage and clamp to said arm structure, and an arm extending generally horizontally and pivotally attached to said clamp to mount said basket to said clamp in pivotally adjustable position in respect to said clamp.

6. A bassinet for attachment to a seat arm structure, said bassinet comprising a baby-holding basket member, a clamp comprising a pair of seat-arm-structure-engaging shoes and an adjustable ratchet device to lock said shoes in predetermined adjusted relative position on said arm structure, and a pivotal member pivotally connecting said clamp and basket member.

7. A bassinet for attachment to a seat arm structure, said bassinet comprising a clamp, a generally horizontal arm pivoted at one end to said clamp for swinging about a generally vertical axis, and a baby-holding basket pivotally attached to the other end of said arm for rotation with respect to said arm about a generally vertical axis.

CHARLES NOLAN.

References Cited in the file of this patent
UNITED STATES PATENTS

| Number | Name | Date |
|---|---|---|
| 822,889 | Faust | June 5, 1906 |
| 1,567,285 | Mitchell | Dec. 29, 1925 |
| 2,524,461 | McDowell | Oct. 3, 1950 |
| 2,590,315 | Hawley | Mar. 25, 1952 |